Sept. 30, 1958   W. J. CAIRNS   2,854,067
TORCH HEAD
Filed Nov. 24, 1954

Inventor
Walter J. Cairns
by Wright, Brown,
Quinby & May
Attys.

United States Patent Office 2,854,067
Patented Sept. 30, 1958

2,854,067
TORCH HEAD

Walter J. Cairns, Melrose, Mass., assignor to Browning Torch Corporation, Boston, Mass., a corporation of Massachusetts Application November 24, 1954, Serial No. 470,993

1 Claim. (Cl. 158—27.4)

This invention relates to improved construction of the head of a torch intended for use with liquid fuel and oxygen. For effective operation with liquid fuel, the fuel must be completely vaporized by the time it issues from the orifices at the extremity of the tip to support the flame. For this purpose the tip is designed to be strongly heated by the flame. It is practically necessary to insulate the tip from the remainder of the head since these parts are of metal and a free conduction of heat from the tip would soon make the entire head too hot. Heat barriers have been used between the tip and the body portion of the head, but these have given trouble due to their tendency to deform under the heat and pressure to which they are subjected in use. According to the present invention a washer of heat insulating and heat resistant material is interposed between the tip and the body portion of the torch head, and the parts are so formed that when assembled they completely enclose and confine the heat insulating washer, thus preventing any deformation of the washer.

An embodiment of the invention is illustrated in the drawing, of which—

Figure 1:
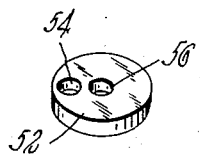
Figure 1 is a perspective view of a heat-insulating washer.
Figure 2:
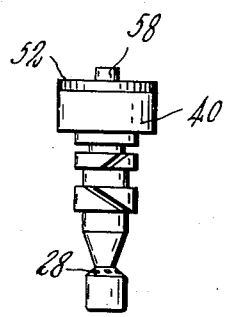
Figure 2 is an elevation of the inner member of a torch tip, with a heat-insulating washer thereon.
Figure 3:
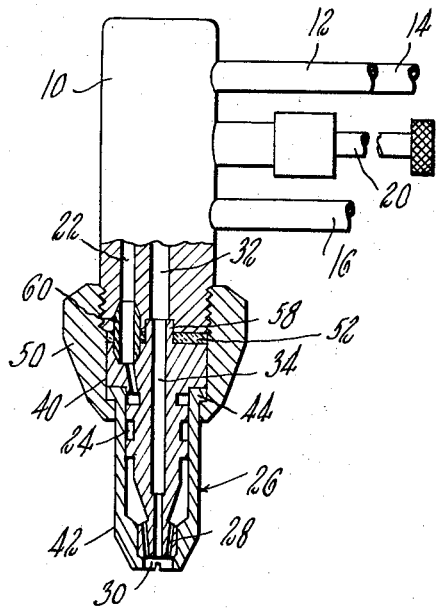
Figure 3 is an elevation of a torch head, showing in section a portion of the body, the tip, and means for securing the tip to the body.

A torch head 10 is shown in Figure 3 with pipes 12 and 14 connected thereto for supplying liquid fuel and low-pressure oxygen, respectively, and a pipe 16 for high-pressure oxygen. A stem 20 controls a needle valve within the head for atomizing the fuel as it is mixed with low-pressure oxygen in the usual manner. The mixture flows down through a passage 22 into mixing chambers 24 in the torch tip 26 where the vaporization of the atomized fuel is completed before the stream is discharged through fine ducts 28 and a discharge orifice 30 at the extremity of the tip. An axial passage 32 communicates with the pipe 16 to deliver high pressure oxygen through a similar passage 34 in the tip 26 to the discharge orifice 30.

The torch tip 26 may consist of an inner member 40 and an outer tubular member 42 which encloses the lower portion of the inner member. The outer member 42 has a radial flange 44 at its upper end to provide a shoulder engageable by a collar 50 to draw the tip tightly against the body portion of the head 10. The body portion of the head is cylindrical so that it has a circular face at its lower end. The tip has a similar circular face at its upper end. Between these faces is interposed an insulating disk 52 of heat-resistant as well as heat-insulating material such as a polymer of tetrafloro-ethylene, described in U. S. Patent No. 2,230,654, pressed asbestos or an equivalent. The disk has two holes 54 and 56 to register respectively with the passagse 22 and 32, and its diameter is equal to those of the mutually confronting end faces of the body and tip of the torch head.

In order to maintain the tip accurately in line with the body portion of the head, the upper end of the tip has a nipple 58 projecting upward axially and fitting into a corresponding recess in the body of the head, this recess being a slight enlargement of the lower end of the passage 32. The nipple 58 surrounds the upper end of the passage 34. Another positioning element for the tip is a thimble 60 the upper end of which fits in a slight enlargement of the passage 22, the lower end fitting into a recess in the tip communicating with the mixing chambers 24. The central hole 56 is snugly fitted by a portion of the nipple 58. The hole 54 is snugly fitted by a portion of the thimble 60. Hence when the head is assembled as shown in Figure 3, the broad faces of the disk 52 are engaged and confined by the end faces of the body and tip, the outer edge surface of the disk is engaged and confined by the collar 50, and the inner edge surfaces, that is, the walls of the holes 56 and 54, are engaged and confined by the nipple 58 and thimble 60 respectively. The entire surface area of the disk is thus confined so that spreading or other deformation of the disk is positively prevented. This results in a much longer life of the disk and a more satisfactory performance by the torch as a whole.

I claim:

A torch head comprising an elongated body member terminating in a planar end face, a tip member terminating in a planar end face, a disk of compressible heat-insulating material disposed between and directly engaged by said end faces, securing means for moving said end faces toward each other to a disk-compressing position and for maintaining the same in said position, said members having spaced aligned fluid-directing passages formed therein, said disk having holes therethrough registering with respective aligned passages in said members, said securing means having an inner surface portion rigidly engaging the entire peripheral surface of said disk, and means extending through said disk holes and rigidly engaging the entire surface of the walls of said disk holes, said means comprising a nipple integral with said tip member and projecting into one of said passages in the body member and a thimble extending at one end into the other passage in the body member and at the other end into the corresponding passage in the tip member.

References Cited in the file of this patent

UNITED STATES PATENTS

| | | |
|---|---|---|
| 1,242,243 | Rose | Oct. 9, 1917 |
| 1,689,551 | Hammond | Oct. 30, 1928 |
| 1,926,438 | Fausek et al. | Sept. 12, 1933 |
| 2,204,756 | Hasse | June 18, 1940 |

FOREIGN PATENTS

| | | |
|---|---|---|
| 499,959 | France | Dec. 3, 1919 |
| 515,537 | Germany | Jan. 7, 1931 |
| 1,056 | Great Britain | 1907 |
| 140,529 | Switzerland | Aug. 16, 1930 |